April 1, 1941.    J. E. CASNER    2,237,095
BRAKE AND HUB ASSEMBLY
Filed Oct. 20, 1939    2 Sheets-Sheet 1
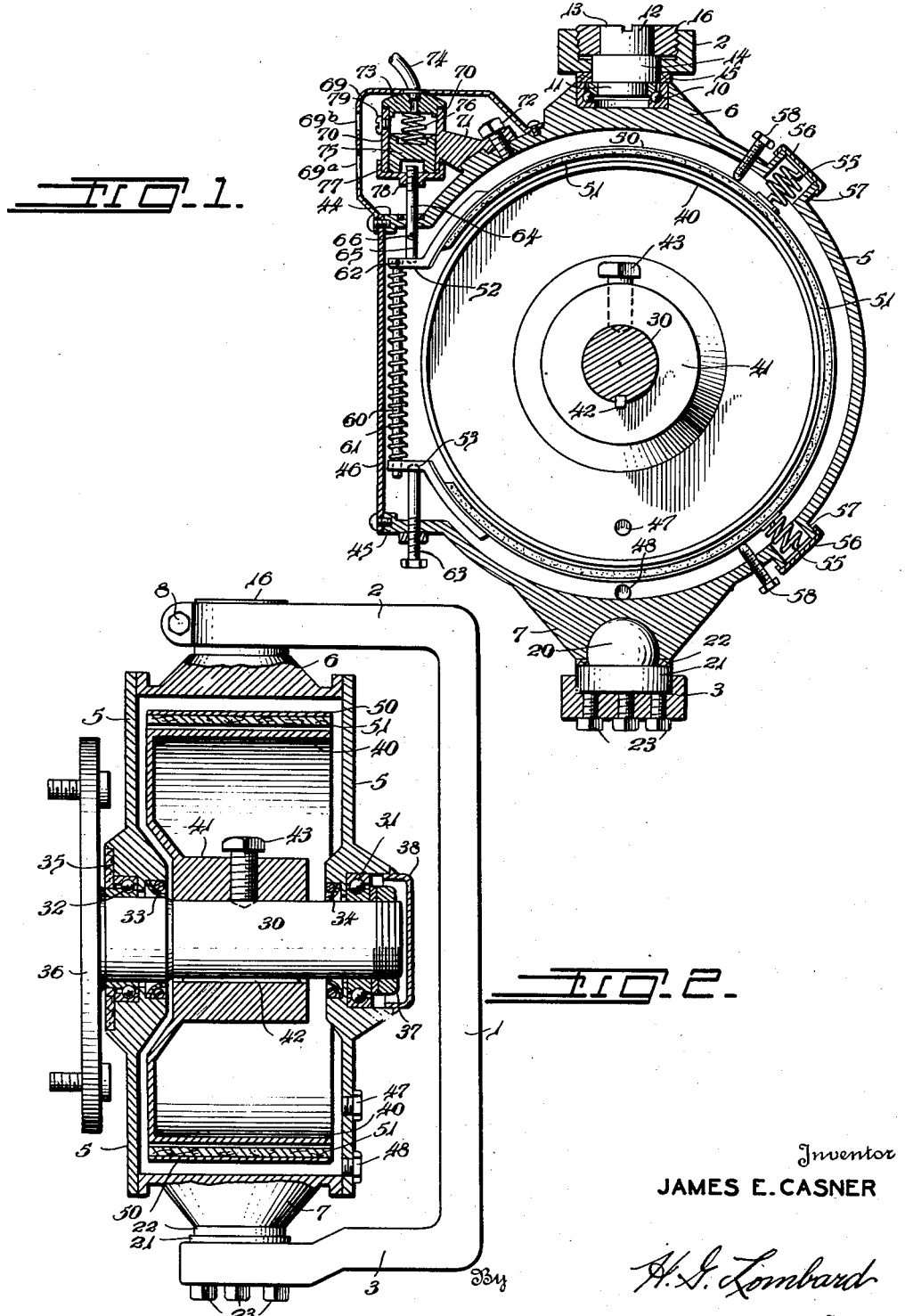
Inventor
JAMES E. CASNER
By H. G. Lombard
Attorney April 1, 1941.  J. E. CASNER  2,237,095
BRAKE AND HUB ASSEMBLY
Filed Oct. 20, 1939    2 Sheets-Sheet 2
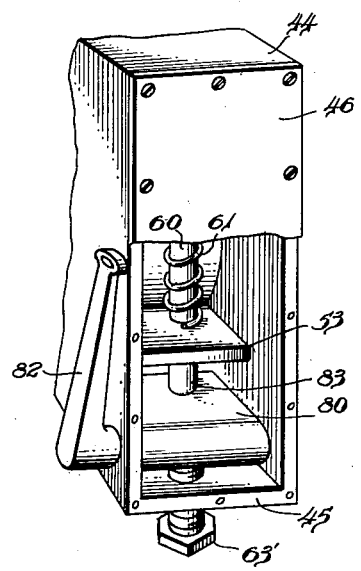
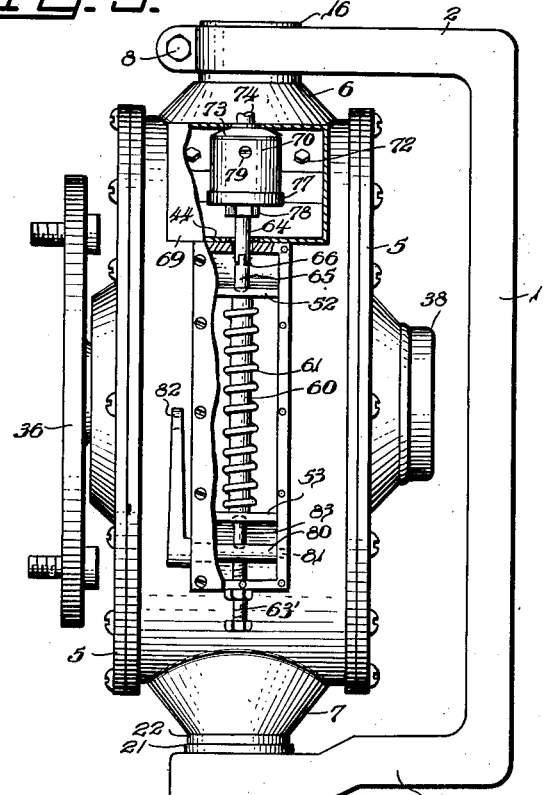
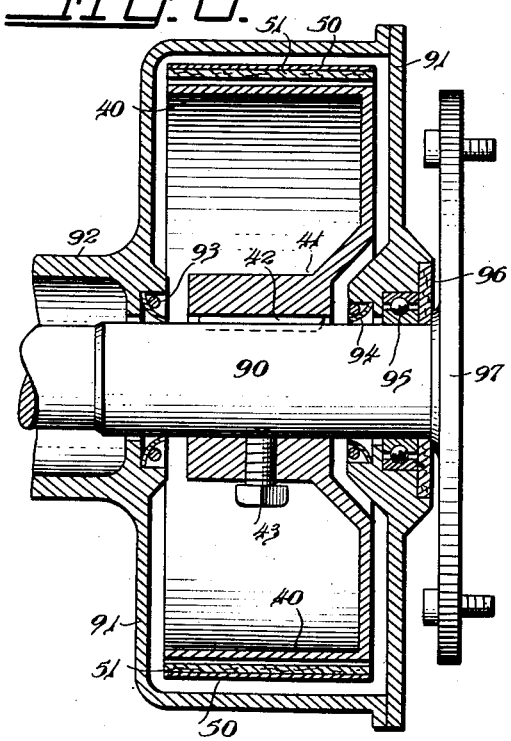
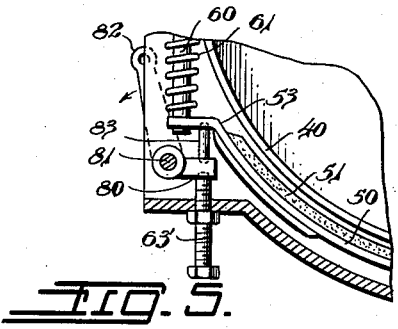
Inventor
JAMES E. CASNER
By H. G. Lombard
Attorney Patented Apr. 1, 1941

2,237,095

UNITED STATES PATENT OFFICE 2,237,095

BRAKE AND HUB ASSEMBLY

James E. Casner, Alpine, Tex.

Application October 20, 1939, Serial No. 300,483

8 Claims. (Cl. 188—106)

This invention relates in general to an improved brake and hub assembly for automobiles and similar vehicles and deals, more particularly, with a brake mechanism of this character operated by air or fluid pressure, the embodiment disclosed herein being designed preferably for the use of oil or similar liquid as the actuating medium.

A primary object of the invention is to provide an improved form of simple, compact and inexpensive brake and hub assembly embodying a general contracting type of brake mechanism and which is adapted for use with the steering wheels mounted on stub axles in a vehicle as well as with the driving wheels in any of the usual types of automobile running gear structures. To this end, the invention contemplates an arrangement in which the brake assembly is completely encased in a simple, compact, dust-proof and water-proof unit in such a manner that all foreign matter conducive to wear of the operating parts is eliminated, thereby prolonging the life of these parts and otherwise reducing to a minimum the requirements for adjustment and repairs thereof after a period of use.

Another principal object is for the provision of a fluid actuated brake of this character encased in a bath of oil which serves to dissipate the heat incident to operation of the brake mechanism and otherwise lubricates the various working parts in such manner as to permit operation thereof without chattering or grabbing and with relatively slow wear on the brake lining, wherefore a comparatively cheap cotton brake lining, for example, may be employed with a simple, inexpensive form of a cast iron brake drum to provide an efficient, highly satisfactory brake unit at relatively low cost.

A further object of the invention aims to provide a fluid actuated brake mechanism of the kind described embodying auxiliary mechanical actuating means adapted to be operated in conjunction therewith to serve, for example, as an emergency or parking brake apparatus. In this relation, the fluid pressure brake mechanism is combined with the mechanical braking mechanism in the assembly in such a manner that the mechanical braking mechanism can be used therewith either as a matter of choice and convenience or in case the fluid pressure mechanism should be out of service for any reason.

Still further objects and advantages of the invention and other new and useful features in the construction, arrangement and general combination of parts thereof will be readily apparent to those skilled in the art as the description proceeds with reference to the accompanying drawings in which like reference characters designate like parts throughout, and in which:

Fig. 1 is a vertical side sectional view of the improved brake and hub assembly of the invention, as provided on a stub axle in a steering wheel unit of an automotive vehicle;

Fig. 2 is a vertical transverse sectional view through the substantial median plane of the brake and hub assembly illustrated in Fig. 1, as viewed from the left;

Fig. 3 is a side elevational view of the brake and hub assembly, parts being broken away to show the brake actuating mechanism within the housing including the auxiliary mechanical brake operating mechanism;

Fig. 4 is an enlarged perspective view of the mechanical brake actuating means embodied in Fig. 3;

Fig. 5 is a close-up side view of the mechanical brake actuating means; and,

Fig. 6 is a vertical transverse sectional view similar to Fig. 2 showing the brake and hub assembly as provided for a driving wheel unit.

Referring now, more particularly to the drawings, Figs. 1–3 inclusive show the improved brake mechanism of the present invention as provided in the steering wheels of a vehicle which, in a front knee-action unit, for example, includes a substantial U-shaped member or yoke 1, providing top and bottom forks 2, 3, by which the brake and hub assembly housing, designated generally 5, is mounted in the running gear. In a preferred arrangement, opposite vertical pivots 6, 7 on the housing are journalled in said forks 2, 3, as best seen in Fig. 1. Preferably top fork 2 is formed of split sections held together in fixed relation by bolt 8, Figs. 2 and 3.

The upper pivot 6 connected to the top fork 2, includes a recess in which a bearing 10 is seated and receives the inner end 11 of a king pin 12. Said king pin is provided with eccentrically disposed ends 11, 13, on either side of a collar 14 which is rotatably seated in an aperture in the lower portion of said fork 2, while a washer 15, of felt or other suitable material is fitted onto said collar, as shown, to provide a seal for said bearing 10. An exteriorly threaded clamping stop nut 16, which is recessed to receive the outer end 13 of the king pin 12, is threaded into the aperture in said fork 2 to maintain the collar 14 of said king pin in clamping relation to said bearing 10 in the adjusted position of the king pin end sections 11, 13, as presently to be described.

The lower pivot 7, associated with bottom fork 3, is provided with a ball and socket mounting in which a ball element 20 is received in an associated socket bearing suitably provided in the body of said pivot. A substantial bearing 21 seated in a recess in the fork 3 supports the ball and socket mounting thus provided while a suitable washer 22 seals the connection, as shown. Stud bolts 23 threaded into the fork 3 from its underside engage the bearing member 21 supporting the ball element 20, and accordingly, suitable adjustment of the ball and socket connection is readily accomplished to provide for any necessary caster and camber of the wheels.

The adjustment in the lower pivot 7, for this purpose, of course, is effected in conjunction with the adjustment in the upper pivot mounting 6, wherein the bolt 8 holding the split sections of fork 2 is loosened as necessary to permit ready rotation of the clamping nut 16 which in turn allows the king pin 12 to be turned. Accordingly, turning of the king pin 12 will effect the desired adjustment in the upper pivot 6 by causing the necessary relative lateral movement of the respective parts associated with the eccentrically disposed king pin end sections 11, 13, to provide the required caster and camber of the wheels.

As best seen in Fig. 2, within the brake housing 5, a stub axle 30 is mounted by inner and outer bearings 31, 32 respectively, said outer bearing being provided with an oil retainer 33 and the inner bearing 31 with a similar device 34. A felt washer 35 or the like seals outer bearing 32 adjacent a wheel mounting flange 36 carried by the stub axle outside said housing 5. On the opposite inner end of said stub axle a lock nut 37, in clamping relation to bearing 31, maintains the assembled parts in the operative relation shown, while a hub cap 38 of any suitable character seals the passage against the entrance of dirt, water or other foreign matter.

On the stub axle 30 thus mounted in the housing 5, there is supported a brake drum 40 having a central bearing collar 41 which is fixedly secured to the shaft by a key 42, while set screw 43 locks the drum against slippage thereon. The housing 5 otherwise is constructed in the manner of a leak-proof chamber in which the center peripheral section is provided with projecting side extensions 44, 45 to which is secured a removable cover plate 46, as shown in Fig. 1. On the inner face of the housing 5, there is provided an oil filler plug 47 at any selected level, while a drain plug 48 adjacent the bottom of the housing permits the same to be readily drained and flushed for cleaning purposes, when necessary.

The brake mechanism associated with the brake drum 40 otherwise comprises a brake band 50 including a brake lining 51. The ends of said brake band are provided with substantial brackets 52, 53, Fig. 1, which may be integral therewith or riveted thereto in any suitable manner. Means are provided for maintaining the brake band 50 and lining 51 carried thereby in normal spaced relation to the brake drum 40. A preferred construction embodies the provision of cooperating pull spring and stop stud devices engaging the brake band at suitable points around the periphery thereof. Such a pull spring 55 is attached at one end to the brake band 50 as shown in Fig. 1, and at its opposite end to a cap device 56 secured to a suitable bushing 57 provided on the housing body. The spring 55 thereby urges the brake band toward spaced relation from the brake drum 40 when not in use, while the adjustable screw 58 serves as a stop stud maintaining the proper clearance between the lining 51 and the brake drum 40.

The brake band otherwise is supported in the housing in operative relation to the brake drum 40, by means of a guide rod 60, Figs. 1 and 3, associated with the brackets 52, 53, and telescoped within a coil spring 61 bearing on said brackets 52, 53, to urge the same apart in normal inoperative position. The upper end of said rod 60, is secured in fixed relation to bracket 52 as by a pintle 62 while the lower end thereof extends through an opening in bracket 53. An adjustable stop screw 63 provided with lock nut means is arranged to engage the underside of said lower bracket 53 to support the associated free end of the brake band and otherwise maintain the proper clearance between the brake lining and drum for most efficient operation. Upper bracket 52 is engaged by a pin 64 having a movable end section 65, pivoted at 66, and otherwise slidably supported in an opening in the housing extension 44 in connection with the fluid pressure brake actuating means within the shell casing 69.

Said fluid actuating means comprises a cylinder 70 having an arm 71 by means of which it is fastened to the brake housing 5 by one or more bolts 72. A fixed head element 73, preferably removable, closes one end of the cylinder and has attached thereto a pipe or hose 74 by which air under pressure, oil or similar fluid pressure means is supplied to the cylinder. A piston 75 in said cylinder, is provided with a depression seating one end of cushioning spring 76 which otherwise bears against the head element 73. A cylinder cap device 77 closes the lower end of the cylinder 70, and this cap device is designed to reciprocate on the outside of the cylinder in response to movement of said piston 75 in contact therewith. Said cap is provided with a nut element 78 into which the adjacent end of the pin 64 is screw threaded. Adjustment of said cap axially of the pin 64 is effected by applying a tool through a suitable opening 69a in the casing to turn the cap and this, of course, varies the effective length of said pin as may be necessary or desirable. Another opening 69b in said casing permits ready access to a suitable plug 79 provided on the cylinder 70 for bleeding purposes.

In the operation of the above described apparatus, when fluid under pressure is admitted to the cylinder 70 through hose 74, the piston 75 is forced downwardly to move the cylinder cap 77 therewith, thus causing the pin 64 to be actuated axially. The brake band bracket 52 in engagement with the lower end section 65 of said pin is thereby forced toward lower bracket 53 compressing the coil spring 61 on rod 60. Since said rod has its upper end fixed to bracket 52 at 62, it is thereby moved axially with the lower end thereof sliding in its seat in the lower bracket 53. Any lateral stress taking place on said pin 64 under force of the actuating piston 75 is compensated for by the pivoted joint 66 which permits the lower end section 65 of the pin to bear inwardly as necessary as it engages brake band bracket 52 whereby to minimize and practically eliminate any possibility of said pin sections 64, 65, binding in the assembly.

The bracket 52 on being thus moved toward the lower bracket 53, causes the brake band 50 to contract around the brake drum 40, as may be readily understood. By relieving the pressure of the fluid against the piston 75, said brackets 52, 53, are permitted to be quickly forced apart to their initial position through the reactive force of the compressed coil spring 61, thereby returning the brake band 50 and the lining 51 carried thereby to spaced relation from the brake drum 40 in the normal position in which the brake mechanism is ready to operate when the various parts are actuated in a repetition of the foregoing procedure.

Figs. 3 to 5 inclusive show the details of construction of an auxiliary mechanical brake actuating means which may be readily embodied in the brake assembly substantially as shown in Fig. 3, to operate in conjunction with the fluid actuating means described, or as an emergency brake apparatus should the fluid pressure mechanism be out of order, or, in a still further relation, as a parking brake apparatus. In the provision of such mechanical braking mechanism in the assembly, the adjustable stop screw 63' is somewhat shorter to bear against the lower face of a substantial crank arm 80 carried by a pintle 81 journalled in the sides of the housing extension. A bell crank lever 82 positioned outside said housing extension substantially as shown in Fig. 4, serves to actuate the crank arm 80 about its pivot mounting. A connecting pin 83 having preferably a floating mounting bears upon said crank arm 80 at one end and at its opposite end firmly engages the lower brake band bracket 53. Accordingly, it will be understood that when the lever arm 82 is actuated in the direction of the arrow, Fig. 5, the crank arm 80 is moved on its pivot mounting provided by the pintle 81, to exert a suitable pressing force on connecting pin 83 which acts upon the lower brake band bracket 53 to cause the brake band 50 to contract around the brake drum 40. During this operation the rod 60 slides freely through the opening in said bracket 53 with the coil spring 61 thereon being compressed. Upon release of pressure on the lever 82, the coil spring 61 is permitted to expand against bracket 53, returning the brake band 50 to normal spaced relation from the brake drum 40 and otherwise forcing said crank arm 80 to its initial position through said connecting pin 83.

Fig. 6 shows a modification in which the general brake structure described with reference to Figs. 1-5 inclusive may be arranged to provide the brake mechanism for a non-steering or driving wheel. In this relation, a drive shaft 90 extends through a housing 91 having an axle sleeve 92 leading to the differential. The brake drum 40, brake band 50, and actuating mechanism therefor contained within said housing 91 are substantially similar in construction, operation and use to that described with reference to Figs. 1 and 2, with like reference characters designating the like parts thereof. Said shaft 90 is provided with an inner grease retainer 93 and an outer oil retainer 94 adjacent the bearing 95 supporting said housing on the shaft. A washer 96 of felt or other suitable material is provided to seal said bearing and the outer extremity of said shaft carries a flange 97 outside the housing for mounting a wheel thereon in the usual manner.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. In a braking mechanism comprising a brake drum mounted on a shaft in a housing, a brake band embracing said drum and having free ends at one side thereof independently movable inwardly toward each other, brackets on said free ends, a rod extending between said brackets and a spring on said rod maintaining said brackets in normal spaced relation, one of said brackets being fixedly positioned against outward movement by means comprising a set screw secured in said housing, the other bracket being associated with a fluid pressure device or the like carried by said housing and having a pin connected thereto, said pin when actuated urging the bracket associated therewith toward said fixedly positioned bracket in providing the braking relation of said brake band with said brake drum.

2. In a braking mechanism comprising a brake drum mounted on a shaft in a housing, a brake band embracing said drum adapted to cooperate therewith, said brake band having free ends at one side of said drum independently movable inwardly toward each other, brackets provided on said free ends, a guide rod extending between said brackets, said rod being connected to one of said brackets and being slidably received in an opening in the other, a spring on said rod maintaining said brackets in normal spaced relation, a spring device supported by said housing and attached to said brake band maintaining the brake band normally in spaced relation to said drum, and actuating means carried by said housing and associated with one of said brackets adapted to move the same toward the other in providing the braking relation of said brake band with said drum, said actuating means comprising a fluid pressure device or the like having an element connected thereto engaging said bracket.

3. In a braking mechanism, a brake drum mounted on a shaft in a housing, a brake band embracing said drum, said brake band having free ends at one side of said drum independently movable inwardly toward each other, brackets provided on said free ends, a rod extending between said brackets and a spring on said rod maintaining said brackets in normal spaced relation, means carried by said housing and associated with one of said brackets adapted to move the same toward the other bracket, said means comprising a fluid pressure device or the like including a substantial cap actuated thereby, a pin engaging said bracket and having a threaded connection with said cap whereby the effective length of said pin may be varied by turning said cap relative to the pin, said pin, when actuated through said cap on the fluid pressure device, exerting a direct force on said bracket in providing the braking relation of said brake band with said drum.

4. In a braking mechanism comprising a brake drum mounted on a shaft in a housing, a brake band embracing said drum, said brake band having free ends at one side of said drum movable inwardly toward each other, brackets provided on said free ends, a rod extending between said brackets and a spring on said rod maintaining the brackets in normal spaced relation, means supported by said housing maintaining the brake band normally spaced from said drum, said means including a spring device attached to the brake band and urging the same to spaced relation from said drum and an adjustable member limiting such spaced relation, and actuating means carried by said housing and associated with one of said brackets adapted to move the same toward the other bracket in providing a braking relation of said brake band with said drum, said actuating means comprising a fluid pressure device or the like having an element in engagement with said bracket adapted to be moved toward the other bracket.

5. In a braking mechanism, a brake drum mounted on a shaft in a dustproof and waterproof housing containing an oil bath for the braking mechanism, a brake band embracing said drum, said brake band having free ends at one side of said drum independently movable inwardly toward each other, brackets provided on said free ends, a guide rod extending between said brackets, a pivotal connection pivotally connecting the rod to one of said brackets with said rod slidably received in an opening in the other bracket, a spring on said rod maintaining said brackets in normal spaced relation, a coil spring and adjustable stop device supported by said housing with said coil spring attached to said brake band and maintaining the brake band normally in spaced relation to said drum, and actuating means carried by said housing and associated with one of said brackets adapted to move the same toward the other bracket in providing the braking relation of said brake band with said drum, said actuating means comprising a fluid pressure device or the like having an element engaging said bracket movable toward the other bracket.

6. In a braking mechanism comprising a brake drum and a brake band embracing said drum adapted to cooperate therewith, said brake band having free ends at one side of said drum independently movable inwardly toward each other, brackets provided on said free ends, a rod extending between said brackets and a spring on said rod maintaining said brackets in normal spaced relation, means associated with one of said brackets adapted to move the same toward the other, said means comprising a fluid pressure device or the like adapted to actuate an element engaging said bracket, mechanical means associated with said other bracket comprising a substantial lever and crank arm device adapted to actuate said other bracket to the braking relation of said brake band with said drum.

7. In a braking mechanism comprising a brake drum mounted on a shaft in a housing, a brake band embracing said drum adapted to cooperate therewith, said brake band having independently movable free ends at one side of said drum, brackets provided on said free ends, a rod extending between said brackets and a spring on said rod maintaining said brackets in normal spaced relation, means carried by said housing and associated with one of said brackets adapted to move the same toward the other, said means comprising a fluid pressure device or the like adapted to actuate an element engaging said bracket, mechanical means associated with said other bracket comprising a substantial lever and crank arm, a connecting pin between said crank arm and said other bracket, said mechanical means being adapted to actuate said connecting pin against said other bracket in providing the braking relation of said brake band with said drum.

8. In a braking mechanism comprising a brake drum and a brake band embracing said drum adapted to cooperate therewith, said brake band having free ends at one side of said drum independently movable inwardly toward each other, brackets provided on said free ends, a rod extending between said brackets, said rod being connected to one of said brackets and passing through an opening in the other, a spring on said rod maintaining said brackets in normal spaced relation, means associated with one of said brackets adapted to move the same toward the other, said means comprising a fluid pressure device or the like adapted to actuate an element engaging said bracket, mechanical means associated with said other bracket comprising a substantial lever and crank arm, a connecting pin between said crank arm and said other bracket, said mechanical means being adapted to actuate said connecting pin against said other bracket in the braking relation of said brake band with said drum.

JAMES E. CASNER.